Patented Aug. 6, 1929.

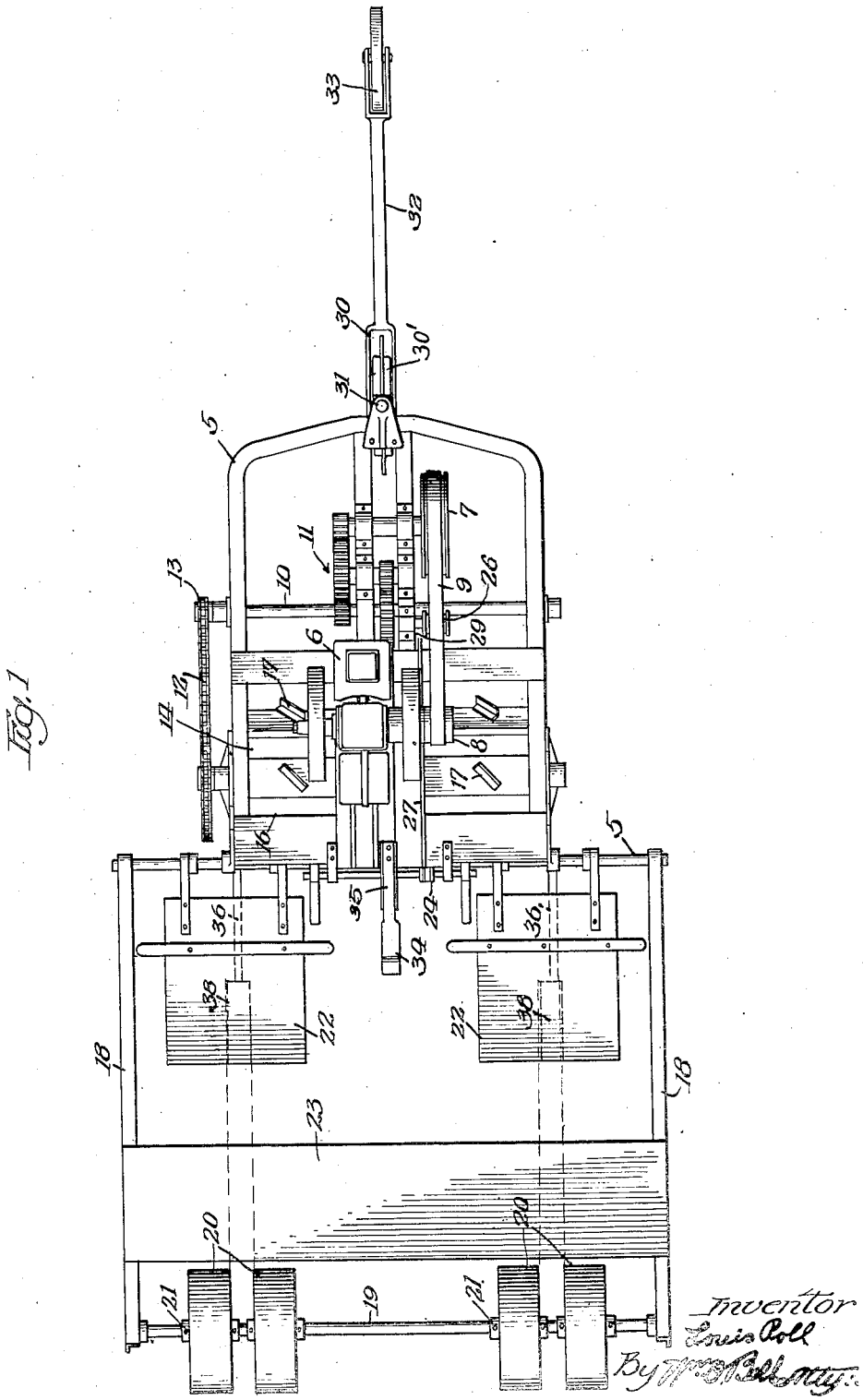

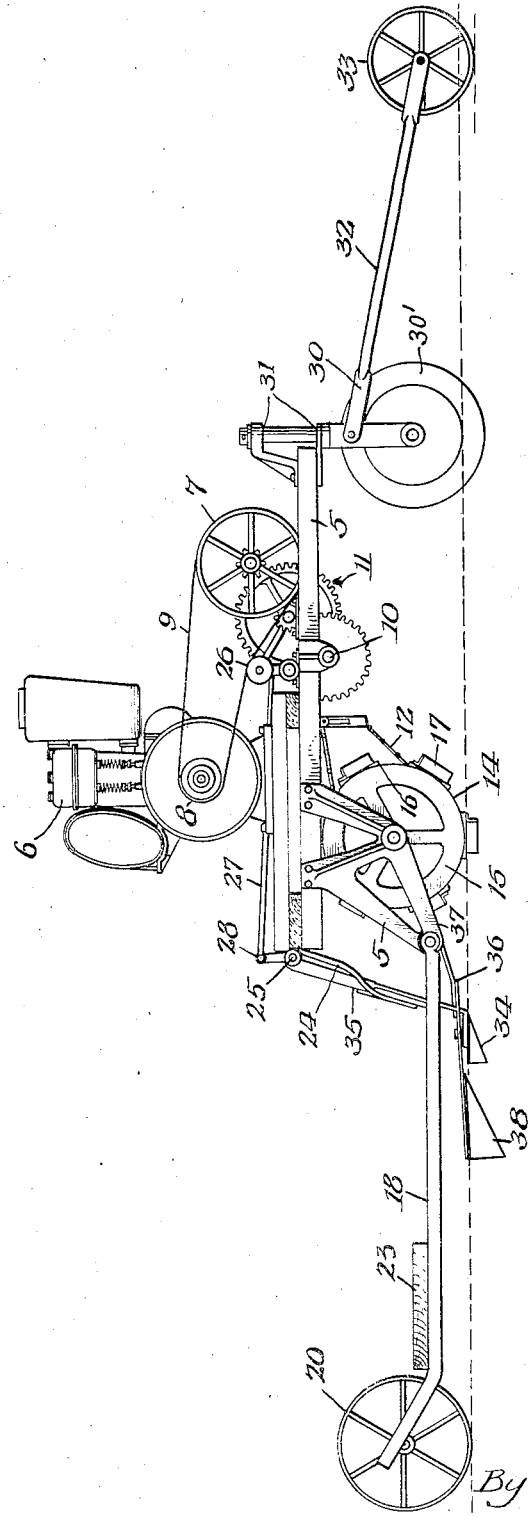

1,723,073

UNITED STATES PATENT OFFICE.

LOUIS POLL, OF HAMILTON, MICHIGAN, ASSIGNOR TO HAMILTON MANUFACTURING COMPANY, OF HAMILTON, MICHIGAN, A CORPORATION OF MICHIGAN.

PLANTING MACHINE.

Application filed August 6, 1927. Serial No. 211,206.

This invention relates to planting machines and more particularly, though not exclusively, to planting machines which are automatically driven.

The invention is adapted for planting a great variety of plants which are generally known as "set" plants such as celery, tomatoes, cabbages and onions and also all such other articles which may be "set" or transplanted, and include tobacco plants, bushes, shrubbery, bulbs and the like.

The object of the invention is to provide a planting machine with novel and improved means for automatically guiding the machine during its operation across a field.

Another object of the invention is to provide a planting machine with a caster wheel at the front, and with a guide wheel positioned in front of the caster wheel and connected with the caster wheel mounting by a bracket arm which is inclined upward from the guide wheel to said mounting so that the line of force on the guide wheel will be forward and downward to hold the guide wheel in the guide furrow.

And a further object of the invention is to provide a planting machine having a caster wheel at its front with a pivoted guide wheel in front of the caster wheel and with a guide blade behind the caster wheel, said guide wheel and blade being arranged to travel in the furrow to guide the machine.

The accompanying drawings illustrate a selected embodiment of the invention and the views therein are as follows:

Fig. 1 is a top plan view of the planting machine; and

Fig. 2 is a side elevation thereof.

Referring to the drawings 5 represents a suitable frame upon which is mounted an engine 6, which drives the pulley 7 connected to the engine fly wheel 8 by means of a belt 9.

A shaft 10 suitably mounted in the frame is driven by the pulley 7 through a chain of gears 11. A chain 12 connected to the gear 13 fixed on the shaft 10 and the drum 14 propels the machine.

The drum is of skeleton construction and comprises the end members or rims 15 which are connected together at intervals by slats 16. Suitable gripping shoes or flanges 17 preferably made of angle irons are fastened to the slats at intervals and provide traction shoes for gripping the earth.

The rear end of the frame is provided with parallel side members 18 and carries the rear axle 19. Packing wheels 20 are slidably mounted on the axle to allow for longitudinal adjustment on the axle and each wheel is provided with set screws 21 or other suitable means for fastening the packing wheels in their adjusted position.

Shelves 22 are fixed to the frame at convenient positions to carry the plants to be planted. A seat 23 is connected to the side members 18 and adjacent the shelves where the operators sit when planting the articles to be planted.

A lever 24 pivoted to the frame at 25 and positioned between the shelves is connected to a belt tightener 26 by a rod 27 pivoted at 28 to the lever and at 29 to the belt tightener. This lever is conveniently located so that an operator may work the same with his foot to pull the tightener away from the belt and permit slippage of the belt to stop the machine.

The swivel yoke 30 is mounted at 31 on the forward end of the frame and it carries a caster wheel 30'. A bracket arm 32 carrying a guide wheel 33 at its forward end is inclined upwardly and pivoted at its rear end to the swivel yoke at a point above the pivot connection of the bracket arm with the guide wheel so that the line of force from the frame to the guide wheel will be forward and downward.

The guide wheel 33 travels in a furrow and guides the machine during its travel over the field. A blade 34 fixed to the arm 35 on the frame travels in the same furrow that the guide wheel 33 travels in and assists in guiding the machine.

A pair of levers 36 are fixed to the frame at 37 and carry furrow shoes 38 at their lower ends and make the furrows into which the plants are set.

The operation of the machine is as follows: The field in which the plants are to be planted is first marked off into furrows; the guide wheel 33 is set in one of these furrows and the engine 6 is set into operation. The operator sits on the seat 23, presses his foot on the lever 24 to operate the tightener 26, and the machine travels across the field in the furrow, being guided by the guide wheel 33 and the blade 34. As the machine moves across the field the shoes 38 make furrows to receive the plants which the operators take from the shelves 22.

The packing wheels are positioned so that one wheel is set on each side of the furrow and the packing wheels fill up the furrow and pack the earth firmly about the plants which have just been set. This operation continues across the field and then the machine is set in the next succeding furrow and the operation is repeated.

I claim:

1. A planting machine comprising a frame, a swivel yoke pivoted on the frame at the front thereof, a caster wheel carried by said yoke, a guide positioned in front of the caster wheel, and a bracket arm pivoted at its rear end to the swivel yoke and carrying the guide at its forward end, said bracket arm being inclined upward from its forward end to its rear end so that the line of force from the frame to the guide will be forward and downward.

2. A planting machine comprising a frame having a swivel yoke and a caster wheel in said yoke, a guide wheel pivotally connected to said yoke and positioned ahead of said caster wheel and adapted to travel in a guide furrow, and a blade carried by the frame at the rear thereof and arranged to travel in said furrow to co-operate with the guide wheel in guiding the machine.

LOUIS POLL.